United States Patent [19]

Kano et al.

[11] Patent Number: 5,067,450
[45] Date of Patent: Nov. 26, 1991

[54] VARIABLE VALVE TIMING SYSTEM HAVING ROTATIONAL VIBRATION DAMPING

[75] Inventors: Junichi Kano, Kariya; Kongoh Aoki, Toyota; Masahiro Mochizuki, Okazaki; Hiroyuki Nakadozono, Toyota, all of Japan

[73] Assignee: Aisin Seiki Kabushiki Kaisha, Kariya, Japan

[21] Appl. No.: 491,208

[22] Filed: Mar. 9, 1990

[30] Foreign Application Priority Data

Mar. 14, 1989 [JP] Japan ................................. 1-61820
Sep. 29, 1989 [JP] Japan ................................. 1-255718

[51] Int. Cl.$^5$ ............................................. F01L 1/34
[52] U.S. Cl. ................................. 123/90.17; 123/90.31
[58] Field of Search ............... 123/90.15, 90.17, 90.31

[56] References Cited

U.S. PATENT DOCUMENTS 4,601,266  7/1986  Oldfield et al. ................ 123/90.15
4,811,698  3/1989  Akasaka et al. ................ 123/90.31
4,841,924  6/1989  Hampton et al. ................ 123/90.17
4,856,465  8/1989  Denz et al. ..................... 123/90.15

Primary Examiner—E. Rollins Cross
Assistant Examiner—Weilun Lo
Attorney, Agent, or Firm—Oblon, Spivak, McClelland, Maier & Neustadt

[57] ABSTRACT

A variable valve timing system in an engine having a rotating cam-shaft includes a timing pulley driven by the engine and a damper case rotatably fixed to the crank-shaft. A piston is movable in a space defined by the timing pulley and the damper case and has helical gears engaging helical gears of the timing pulley and damper case such that the angular position between the timing pulley and the damper case varies as the piston is moved. Movement of the piston is induced by hydraulic pressure in a pressure chamber selectively connected to hydraulic pressure by an electronically controlled solenoid valve. Engaging labyrinth grooves on the timing pulley and damper case damp rotational vibrations which would otherwise be induced by variations in the torque applied to the damper case, and so prevent undesirable movement of the piston.

12 Claims, 5 Drawing Sheets

VARIABLE VALVE TIMING SYSTEM HAVING ROTATIONAL VIBRATION DAMPING

BACKGROUND OF THE INVENTION

1. Field of the Invention

The present invention relates to a variable valve timing system, and more particularly to a variable valve timing system for an engine of a vehicle.

2. Background of the Related Art

A conventional variable valve timing system 500 is disclosed in Japanese Patent Publication No. 62(1987)-3111, and is shown in FIG. 5. The variable valve timing system 500 is used for an engine of a vehicle (not shown). In the variable valve timing system 500, a timing pulley 501 has an inner helical gear 501a and an outer gear 501b. The outer gear 501b is geared with a timing belt 502. A camshaft 503 is rotatably supported in a cylinder-head 506 of the engine, and has an oil conduit 503a formed inside thereof. A cylindrical member 504 forms an outer helical gear 504a and is held on the cam-shaft 503 by a hollow bolt 507.

A cylindrical piston system 505 includes a first piston 505a, a second piston 505b, a plate 505c, a first spring 505d and a second spring 505e. The first piston 505a and the second piston 505b have respective inner helical gears 505a-1 and 505b-1 and respective outer helical gears 505a-2 and 505b-2. The inner helical gears 505a-1 and 505b-1 are geared with the outer helical gear 504a. The outer helical gears 505a-2 and 505b-2 are geared with the inner helical gear 501a.

The first piston 505a is operatively connected with the plate 505c. The first spring 505d is interposed between the first piston 505a and the second piston 505b, so that the first piston 505a, the second piston 505b and the first spring 505d constitute a scissors gear system for decreasing a backlash.

A cam-shaft cover 508 is fixed to the timing pulley 501 by bolts 509. A pressure chamber 510 is formed between the plate 505c and the cam-shaft-cover 508. The pressure chamber 510 is in fluid communication with the oil conduit 503a via the hollow bolt 507.

In the above-mentioned variable valve timing system 500, the timing belt 502 is driven by a crank-shaft of the engine (not shown). Thus, the timing pulley 501 is rotated by the timing belt 502, and the cam-shaft 503 is rotated through the cylindrical piston system 505. The cam-shaft 503 drives some valves of the engine (not shown), so that some valves are opened or closed. A change of the revolution speed of the engine requires a change in the timing by which these valves are opened or closed.

In the pressure chamber 510, there is provided high-pressure oil supplied from an oil tank (not shown) through a control valve (not shown) and the oil conduit 503a. This causes the cylindrical piston system 505 to move in the rightward direction. Therefore, the relative angle between the timing pulley 501 and the cam-shaft 503 is changed by the helical gears between the timing pulley 501 and the cylindrical piston system 505 and between the cylindrical piston system 505 and the cam-shaft 503. Consequently, the timing by which some valves are opened or closed is changed.

In the normal driving of the engine, the cylindrical piston system 505 receives a torque variation from the cam-shaft 503 as the cam lobes sequentially engage and disengage the cam followers, producing rotational vibrations between the timing pulley and the cam-shaft, as a result of which the cylindrical piston system 505 may move in the rightward direction, even though the pressure chamber 510 is not supplied with high pressure oil. Thus, the spring 505e must be strong to avoid such movement.

SUMMARY OF THE INVENTION

Accordingly, it is a primary object of the present invention to absorb a torque variation of a cam-shaft in a variable valve timing system.

The above, and other objects, are achieved according to the present invention by a variable valve timing system in an engine having a rotating cam-shaft and comprising a first timing member driven the engine and a second timing member rotatably fixed to the crank-shaft. The system also includes a helical means engaged between the first and second timing members and including a piston movable for adjusting an angular position between the first and second timing members, as well as hydraulic circuit means for selectively applying a hydraulic pressure to the piston for selectively moving the piston to adjust the angular position. Damper means are provided on the first and second timing members for hydraulically damping rotational vibrations between the second timing member and the first timing member, whereby torque variations applied to the second timing member relative to the first timing member do not cause a change in the angular position between the first and second timing members.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
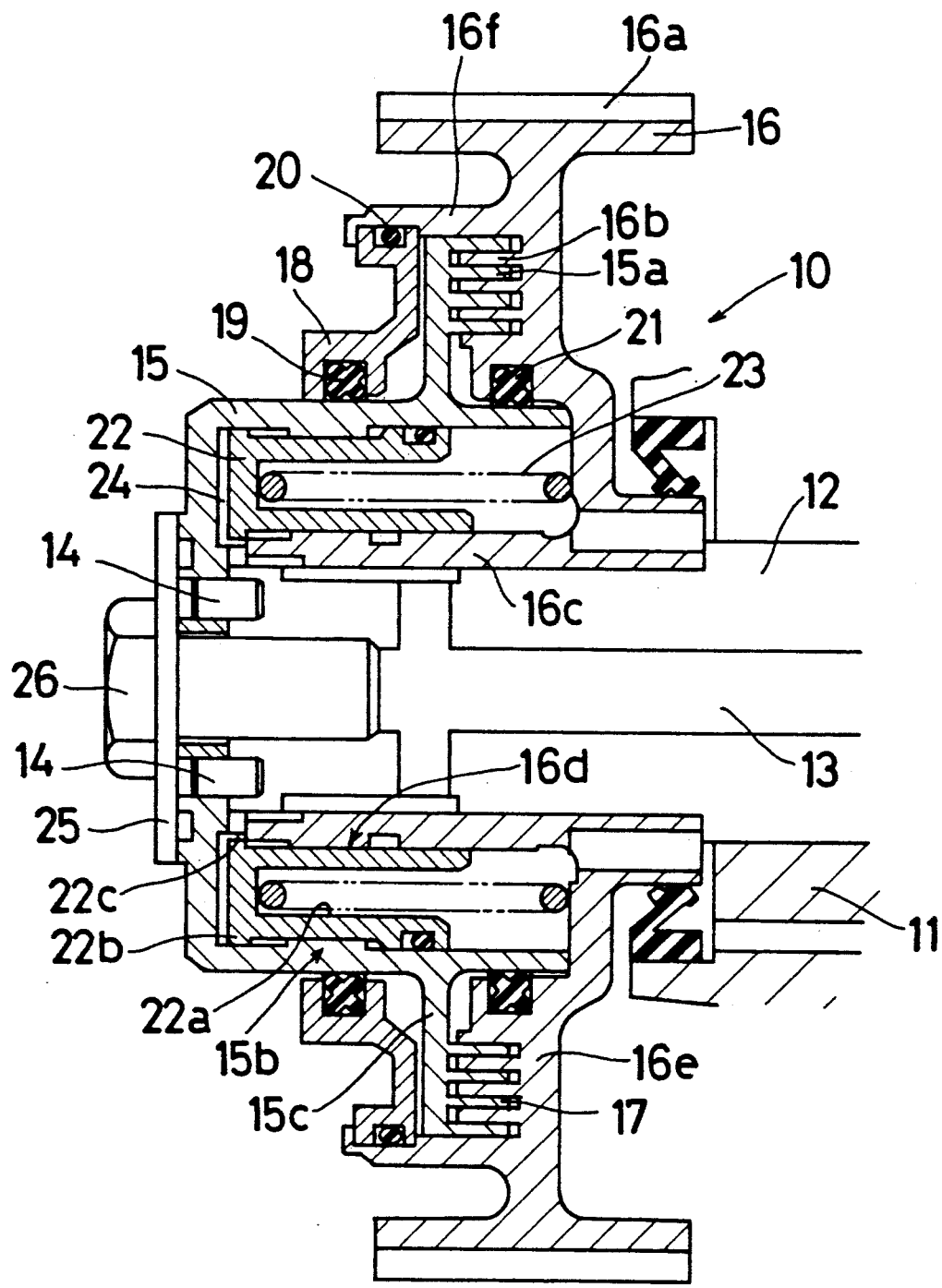
FIG. 1 is a cross-sectional view of a variable valve timing means according to the invention.
Figure 2:
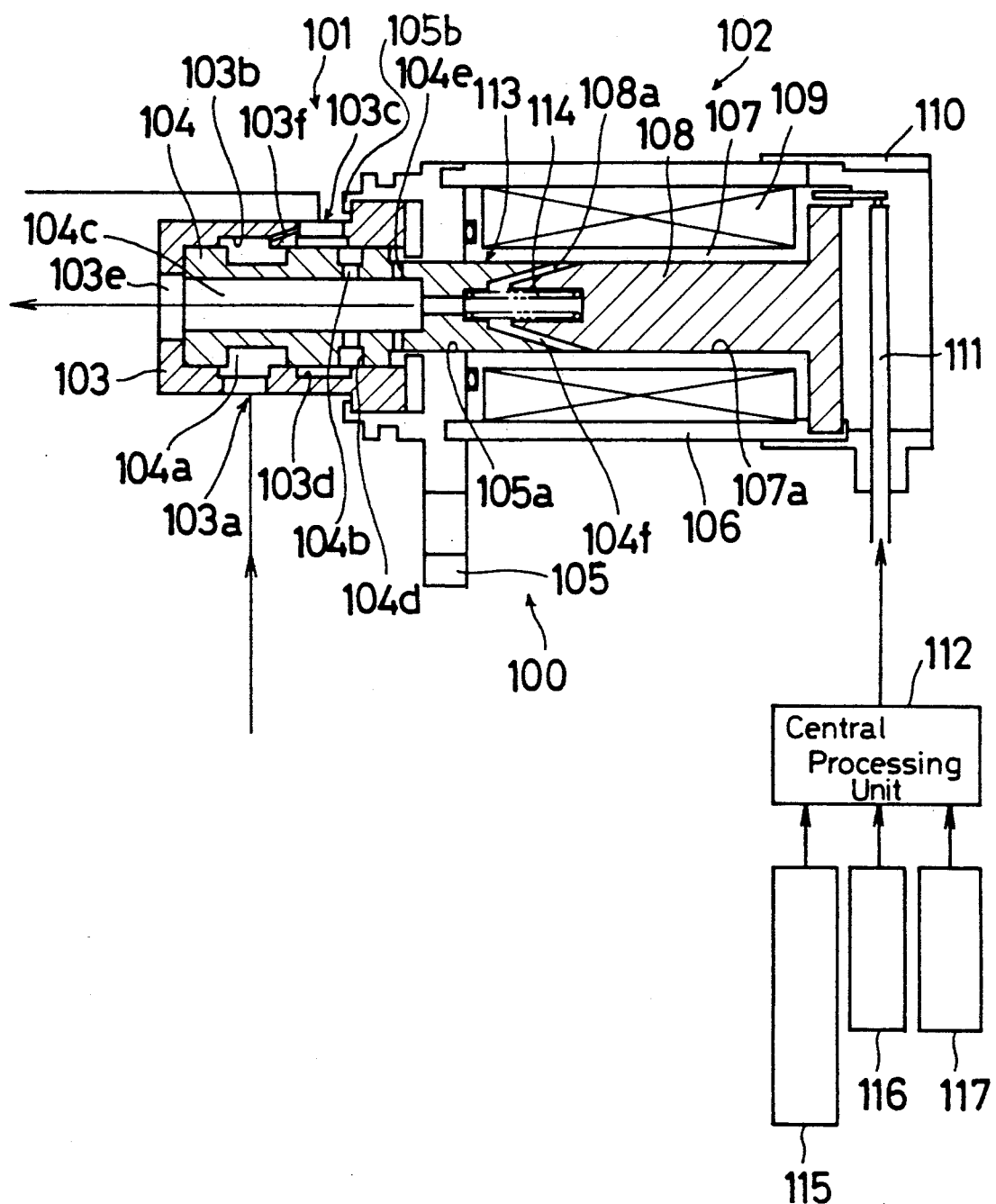
FIG. 2 is a cross-sectional view of a control valve means for the variable valve timing system according to the invention.

Referring first to the embodiment of the present invention shown in FIGS. 1 and 2, wherein a variable valve timing means 10 and a control valve means 100 are shown, variable valve timing is provided by the variable valve timing means 10 and the control valve means 100. A cam-shaft 12 is rotatably supported by a cylinder-head 11, and has an oil conduit 13 formed inside thereof. A timing pulley 16 (first timing member) is rotatably supported on the cam-shaft 12, and has an outer gear 16a that meshes with a timing belt (not shown). An outer surface of a cylindrical portion 16c of the timing pulley 16 has an outer helical gear 16d.

A cylindrical piston means 22 has a ring-shaped groove 22a, an outer helical gear 22b and an inner helical gear 22c. The inner helical gear 22c is geared with the outer helical gear 16d. A spring 23 is interposed between the inside of the ring-shaped groove 22a and the timing pulley 16. The spring 23 urges the cylindrical piston means 22 in the leftward direction.

A damper case 15 (second timing member) has an inner helical gear 15b and a plurality of ring-shaped labyrinth grooves 15a formed in a radial flange portion 15c thereof. In a radial arm portion 16e of the timing pulley 16, a plurality ring-shaped labyrinth grooves 16b are oppositely meshed with the ring-shaped labyrinth grooves 15a. Ring-shaped labyrinth grooves 15a and 16b form a viscous damper means 17. The damper case 15 is fixed to the cam-shaft 12 by knock pins 14 and a bolt 26 with a ring-shaped plate 25. Thus, the damper case 15 will not rotate relative to the cam-shaft 12.

The piston 22 and the helical gears 15b, 16d, 22d, and 22c together comprise helical means for adjusting an angular position between the first second timing members.

An oil chamber 24 is located between the damper case 15 and the cylindrical piston means 22. The oil chamber is in fluid communication with the oil conduit 13.

A ring-shape cover 18 is fixed to a flange portion 16f of the timing pulley 16 and sealed via a sealing member 20. It is contacted with the damper case 15 and sealed via a sealing member 19. A sealing member 21 is located between the damper case 15 and the arm portion 16e. Thus, viscous fluid enclosed in the viscous damper means 17 does not leak.

The oil conduit 13 is in fluid communication with an outlet 103c of the control valve means 100.

The control valve means 100 includes a valve means 101 and a solenoid means 102. The valve means 101 is constituted by a valve housing 103 and a moving valve 104 in the form of a spool valve An inlet 103a, a ring-shaped groove 103b, the outlet 103c, a ring-shaped groove 103d and a drain port 103e are formed in the housing 103. The fluid communication between the ring-shaped groove 103b and the outlet 103c is established by a minute hole 103f formed in the housing 103 between groove 103b and outlet 103c. A ring-shaped groove 104a, a communicating hole 104b, a center hole 104c, a ring-shaped groove 104d and a communicating hole 104e are formed in the moving valve 104.

The inlet 103a is connected to a high pressure oil source (not shown). The drain port 103e is connected to an oil-pan (not shown).

The solenoid means 102 comprises means for selectively moving the valve member and has an inner portion 107a of a cylindrical bobbin 107 thereof, within which a stationary core 108 is inserted. A coil 109 is wound around the bobbin 107. Around the coil 109, an outer yoke 106 is located, and is magnetically connected with the stationary core 108. The outer yoke 106 is supported by a yoke 105 and a housing 110. In the housing 110, electric current lines 111 are fixed by resin. One end of each of the lines 111 is connected to the coil 109, and the other end is connected to a central processing unit 112.

The moving valve 104 (as a moveable core of the solenoid means 102), the yoke 105, the outer yoke 106 and the stationary core 108 are made of magnetic material.

The yoke 105 has a hole 105a, and is fixed to the housing 103 by a bending portion 105b. In the hole 105a and the inner portion 107a, the right end of the moving valve 104 is inserted. A clearance 113 is defined between the moving valve 104 and both the yoke 105 and the bobbin 107.

A right tapering end 104f of the moving valve 104 is opposite to a left tapering end 108a of the stationary core 108. A spring 114 is interposed between the end 104f and the end 108a.

A signal of the revolution speed sensor 115 of an engine, a signal of a load sensor 116 of the engine and a signal of a water-temperature sensor 117 of the engine are inputted to the central processing unit 112, and the unit 112 outputs driving current to the coil 109.

The operation of the variable valve timing system according to the first embodiment is described hereinafter. The driving force of the engine is transmitted to the timing pulley 16 by the timing belt, so that the timing pulley 16 is rotated. The rotation of the timing pulley 16 is transmitted to the cam-shaft 12 through the outer helical gear 16d, the inner helical gear 22c, the cylindrical piston means 22, the outer helical gear 22b, the inner helical gear 15b, the damper case 15 and the knock pins 14.

Consequently, an intake valve and/or an exhaust valve (not shown) are driven by the cam-shaft 12 via a cam (not shown). At this time, the outlet 103c is in fluid communication with the drain port 103e via the ring-shaped groove 103d, the ring-shaped groove 104d, the communicating hole 104b and the center hole 104c. Thus, the oil pressure is not applied to the oil chamber 24, so that the cylindrical piston means 22 is urged in the leftward direction (i.e., a direction to reduce the size of oil chamber 24) by the spring 23. Consequently, the certain definite valve timing is established.

In this definite condition of the valve timing, the timing pulley 16 is subjected to torque variations from the cam-shaft 12 via the cylindrical piston means 22. There is thus a danger of rotational vibrations in the angular positions of the first and second timing members changing the relative angle between the timing pulley 16 and the cam-shaft 12, thereby producing an altered valve timing. However, the viscosity damper means 17 absorbs any such vibrations due to torque variation. Namely, the large shearing resistance of viscous fluid between the ring-shaped labyrinth grooves 15a and the ring-shaped labyrinth grooves 16b absorbs the torque variations. Thus, the relative angle between the timing pulley 16 and the cam-shaft 12 is not changed, and the valve timing is unaltered.

Now, if the running condition of the engine changes, i,e., the revolution speed of the engine, the load of the engine and/or the water-temperature of the engine, it is desirable that the valve timing of the intake valves and/or the exhaust valves are changed, because the intake air quantity that the engine needs changes according to the running conditions of the engine.

At this time, the central processing unit 112 outputs driving current to the coil 109 through the line 111. As the coil 109 is applied with driving current, magnetic flux is generated in the coil 109, the outer yoke 106, the yoke 105, the moving valve 104 and the stationary core 108. Thus, the moving valve 104 is moved in the rightward direction against the urging force of the spring 114.

Consequently, the fluid communication between the outlet 103c and the drain port 103e is interrupted, and the fluid communication between the inlet 103a and the outlet 103c is established. High pressure oil thus flows from the high pressure oil source to the oil chamber 24 through the control valve means 100 and the oil conduit 13.

Because of the flowing of the high pressure oil into the oil chamber 24, the cylindrical piston means 22 is moved in the rightward direction against the urging force of the spring 23. By means of the helical gears 15b, 22b, 22c, 16d, the relative angle between the timing pulley 16 and the cam-shaft 12 is changed, so that the valve timing of the intake valve and/or the exhaust valve are changed.

Next, if running conditions again change so that it is no longer desirable that the valve timing of the intake valve an the exhaust valve are changed, the central processing unit 112 stops outputting driving current. Thus, the magnetic flux vanishes, so that the moving valve 104 is moved in the leftward direction by the urging force of the spring 114, the fluid communication between the outlet 103c and the drain port 103e is established, and the application of fluid pressure to the outlet 103c is interrupted.

Therefore, oil in the oil chamber 24 flows to the oil-pan through the oil conduit 13 and the control valve means 100, so that the cylindrical piston means 22 is moved in the leftward direction according to the urging force of the spring 23. Thus, the relative angle between the timing pulley 16 and the cam-shaft 12 is returned to its original condition, so that the valve timing of the intake valve and/or the exhaust valve are returned to their original conditions.

At this time a small flow of high pressure oil from the ring-shaped groove 103b flows to the outlet 103c through the minute hole 103f, so that a bubble is not formed.

In the above first embodiment, there are many advantages as follows:

The torque variation from the cam-shaft 12 is absorbed by the viscous damper means 17 that is in compact size, so that the variable valve timing means 10 is also in compact size. Further, the viscous damper means 17 absorbs backlash between the helical gear 15b and the helical gear 22b and between the helical gear 22c and the helical gear 16d. Thus, noise is not generated in the helical gears 15b, 22b, 22c, 16d. Further, the stiffness of the spring 23 can be small, so that the cylindrical piston means 22 can be moved by low oil pressure, i.e., when the revolution of the engine is low, the oil pressure is also low, Thus, the action of the variable valve timing system is not influenced by the revolution speed of the engine. Further, the response of the variable valve timing system is fast.

Next, referring to FIG. 3 which shows a control valve means 200 of a second embodiment of the control valve means according to the present invention only the construction different from the first embodiment of the control valve means will be described hereinafter.

The control valve means 200 includes a valve means 20 and a solenoid means 202. The valve means 201 is constituted by a housing 203 and a moving valve 204. The housing 203 has an outlet 203a, a drain port 203b and a chamber 203c. In the chamber 203c, a first valve-seat 203d is formed on the housing 203. A member 205 is fixedly held in the chamber 203c by a ring 206. An inlet 205a and a second valve seat 205b are formed on the member 205. A seal-ring 207 is located between the inner circumferential surface of the housing 203 and the outer circumferential surface of the member 205.

The moving valve 204 comprises a rod 208, a valve 209, a cup 210 and a sheet spring 211. The valve 209 has a hole 209a, and the one end of the rod 208 is fitted in the hole 209a. The rod 208 has a center hole 208a which extends in the axial direction thereof, and a communication hole 208b which is formed in the rod 208 to extend in the radial direction thereof. The other end of the rod 208 is fixed to a movable core 212. The inner circumferential portion of the sheet spring 211 is held between the cup 210 and the end of the movable core 212, and is fixed by a flange portion 208c of the rod 208.

The solenoid means 202 comprises the movable core 212, a stationary core 213, a spring 214, a bobbin 215, a coil 216, a housing 217, a side yoke 218 and a yoke 219. The coil 216 is wound on the bobbin 215, and the bobbin 215 has a center hole 215a. The housing 217 is molded on the bobbin 215 wound with the coil 216, and has a connecting portion 217a. The side yoke 218 is located on the outer portion of the housing 217, and is magnetically connected with the stationary core 313. The stationary core 213 is inserted in the hole 215a, and is fixed by the one end of the side yoke 218. The spring 214 is located between the movable core 212 and a groove 213a that is formed in the stationary core 213. The yoke 219 fixes the other end of the side yoke 218, and has a center hole 219a. The movable core 212 inserted in the center hole 219a.

The outer circumferential portion of the sheet spring 211 is held between the housing 203 and yoke 219. The housing 203 is fixed to one end of the side yoke 219.

A chamber 220 is enclosed by the back side of the sheet spring 211, the movable core 212 and the yoke 219. The movable core 212 has a communication hole 212a which is formed in the radial direction of the movable core 21, and which is coincided with the communication hole 208b. Therefore, the fluid communication between the inlet 205a and the chamber 220 is established by the center hole 208a, the communication hole 208b and the communication hole 212a.

The connector 217a is connected with the central processing unit 112. This is the same as in the first embodiment of the control valve means 100 according to the invention.

The operation of the control valve means 200 according to the second embodiment is generally the same as that described with reference to FIG. 2, so that only the differences in operation will be described.

The high pressure oil generated by the engine is introduced into the inlet 205a. At this time, the oil is introduced into the chamber 220 through the center hole 208a, the communication hole 208b and the communication hole 212a.

Figure 3:
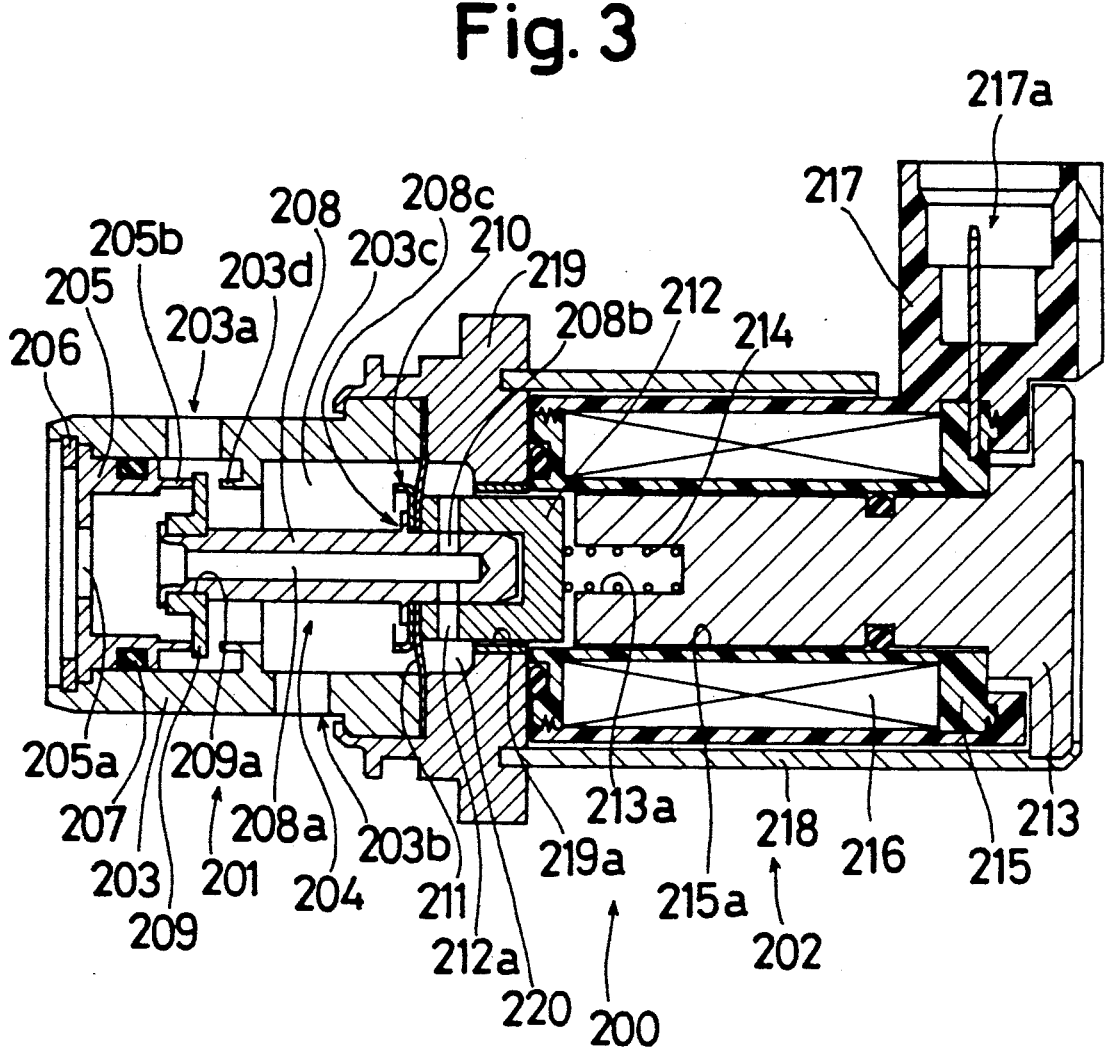
FIG. 3 is a view similar to FIG. 2, showing another embodiment of the control valve means according to the invention.

When the coil 216 does not receive the driving current from the central processing unit 112, the location of the parts of the control valve means 200 is as shown in FIG. 3. Namely, the valve 209 is contacted with the second valve-seat 205b. Thus, the outlet 203a is in communication with the drain port 203b.

Next, when the coil 216 receives the driving current, the movable core 212 is moved in the rightward direction by the magnetic force against the urging force of the spring 114. The valve means 201 is also moved in the rightward direction. Thus, the valve 209 is separated from the second valve seat 205b and is contacted with the first valve seat 203d.

Consequently, the inlet 205a is in fluid communication with the outlet 203a. At this time, oil pressure of the inlet 205a urges both the valve 209 and the sheet-spring 211, so that the movement of the valve means 201 is not influenced by the oil pressure.

Advantages according to the second embodiment of the control valve means 200 as illustrated above are also realized.

Next, referring to FIG. 4 which shows a variable valve timing means 330 of a second embodiment of the present invention, only the construction different from the first embodiment of the variable valve timing means will be described hereinafter.

Ring-shaped labyrinth grooves 318a are made in the ring-shaped cover 18. Ring-shaped labyrinth grooves 327 are made in a member 327 fixed to the damper case 15.

Advantages according to the second embodiment of the variable valve timing means 300 are also realized.

It is noted that the variable valve timing systems can be constituted by the following combinations.

(1) FIG. 1 (variable valve timing means) plus FIG. 2 (control valve means).

Here, the outlet 103c is in fluid communication with the coil conduit 13. This combination is described as the first embodiment.

(2) FIG. 1 (variable valve timing means) plus FIG. 3 (control valve means).

Here, the outlet 203a is in fluid communication with the oil conduit 13.

Figure 4:
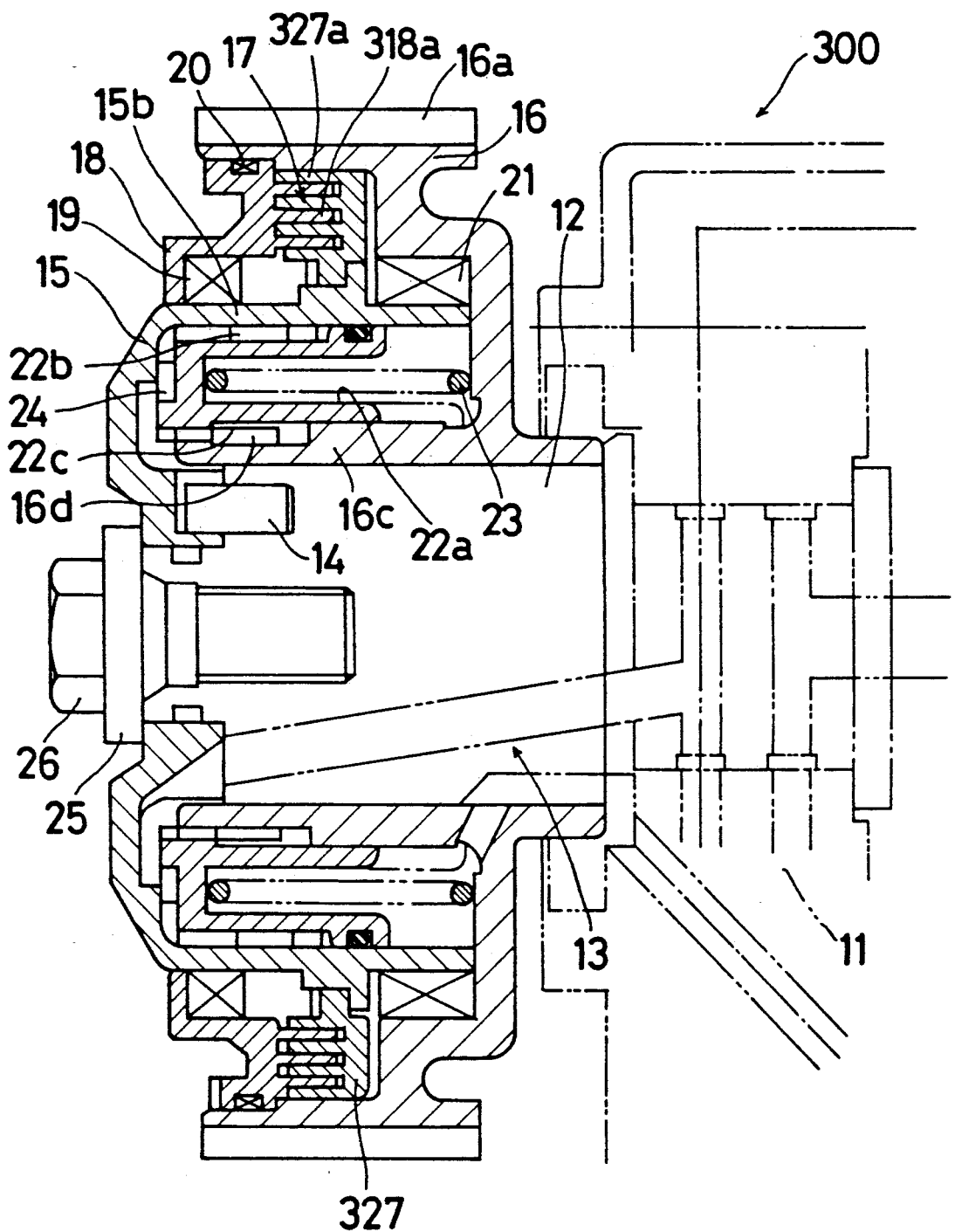
FIG. 4 is a view similar to FIG. 1, showing another embodiment of the variable valve timing means according to the invention.
Figure 5:
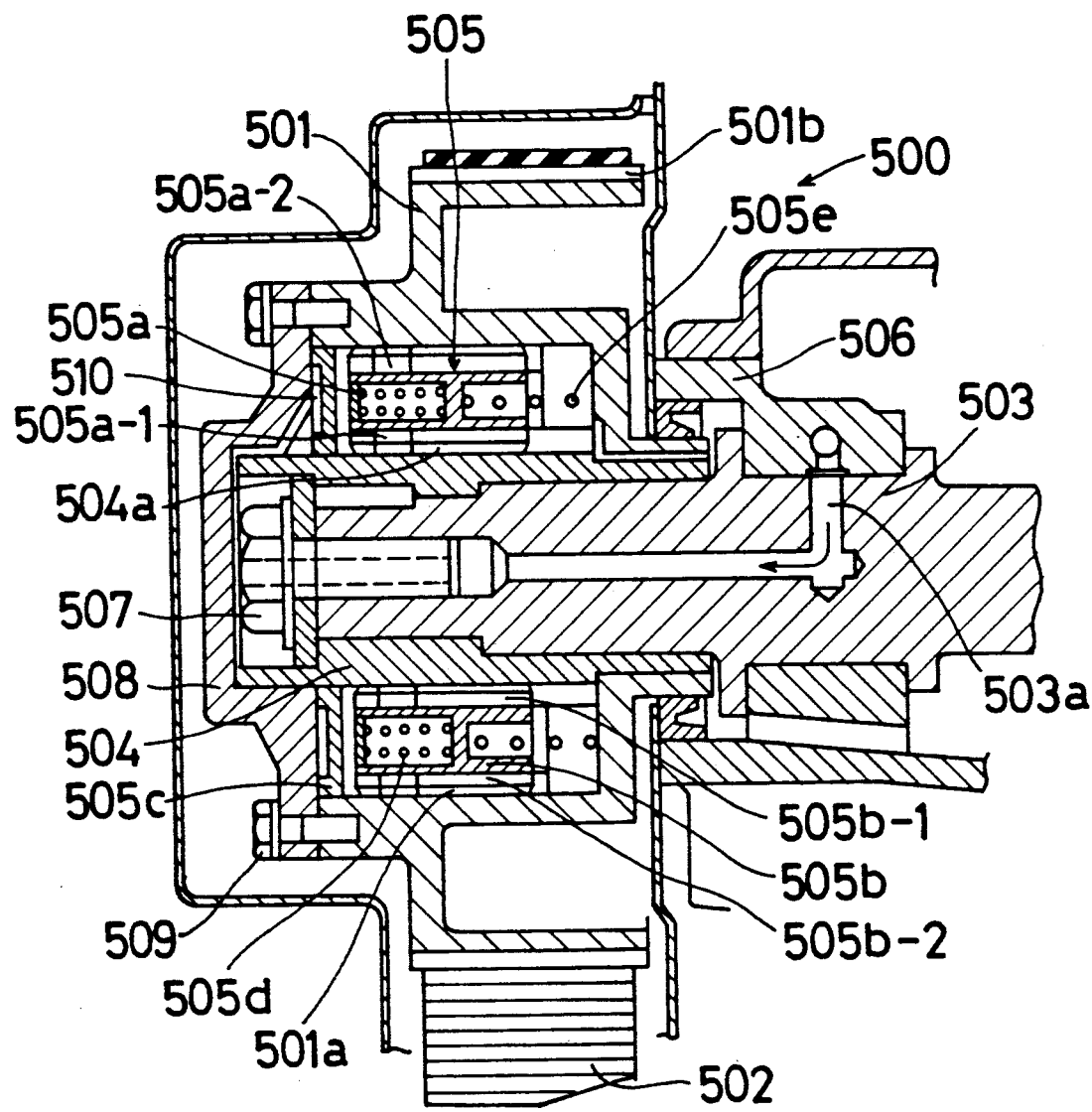
FIG. 5 is a cross-sectional view of a conventional variable valve timing system.

(3) FIG. 4 (variable valve timing means) plus FIG. 2 (control valve means).

Here, the outlet 103c is in fluid communication with the oil conduit 13.

(4) FIG. 4 (variable valve timing means) plus FIG. 3 (control valve means).

Here, the outlet 203a is in fluid communication with oil conduit 13.

Numerous modifications and variations of the present invention are possible in light of the above teachings. It is therefore to be understood that the invention is defined by the scope of the appended claims, and the invention may be practiced in way other than those specifically described herein without departing from the intent and teachings of the invention.

What is claimed as new and desired to be secured by letters patent of the U.S. is:

1. A variable valve timing system in an engine having a rotating cam-shaft, comprising:
    a first timing member driven by the engine;
    a second timing member rotatably fixed to the crankshaft;
    helical means engaged between said first and second timing members and including a piston movable for adjusting an angular position between said first and second timing members;
    hydraulic circuit means for selectively applying a hydraulic pressure to said piston for selectively moving said piston to adjust said angular position; and
    damper means on said first and second timing members for hydraulically damping rotational vibrations between said second timing member and said first timing member,
    whereby torque variation applied to said second timing member relative so said first timing member do not cause a change in said angular position.

2. The system of claim 1 wherein said damper means comprise a plurality of meshing labyrinth grooves on said first and second timing members and a viscous fluid between said labyrinth grooves.

3. The system of claim 2 wherein said first timing member comprises a timing pulley rotatably mounted on the cam-shaft and said second timing members comprises a damper case cooperating with said piston to define an oil chamber.

4. The system of claim 3 wherein said labyrinth grooves are respectively provided on a radial arm portion of said first timing member and a radial flange portion of said second timing member.

5. The system of claim 3 wherein said labyrinth grooves are respectively provided on a ring shaped cover fixed to said first labyrinth members and a member fixed to said damper case.

6. The system of claim 3 wherein said helical means comprises inner and outer gears on said piston, a helical gear on said timing pulley and meshing with said inner gear, and a helical gear on said damper case and meshing with said outer gear.

7. The system of claim 3 including a spring for biasing said piston so as to reduce the size of said oil chamber.

8. The system of claim 3 wherein said hydraulic circuit means comprise:
    a control valve having a valve housing, a valve member in said valve housing, an inlet in said valve housing and connected to a source of pressurized hydraulic fluid, and an outlet in said valve housing;
    an oil conduit connecting said outlet to said oil chamber; and
    a solenoid comprising means for selectively moving said valve member to selectively communicate said outlet with said inlet.

9. The system of claim 8, wherein said oil conduit extends into the cam-shaft.

10. The system of claim 8 inducing electronic control means for operating said solenoid in response to detected engine running conditions.

11. The system of claim 8 wherein said valve member comprises a spool valve, including a minute hole in said valve housing connecting said inlet and said outlet when said valve member is closed.

12. The system of claim 8 wherein said control includes a diaphragm movable with said valve member and means for applying pressurized hydraulic fluid to a back side of said diaphragm.

* * * * *